Feb. 25, 1958     C. S. KELLEY     2,824,713
AIRPLANE WEIGHT RESPONSIVE WHEEL BRAKE APPARATUS
Filed March 27, 1953
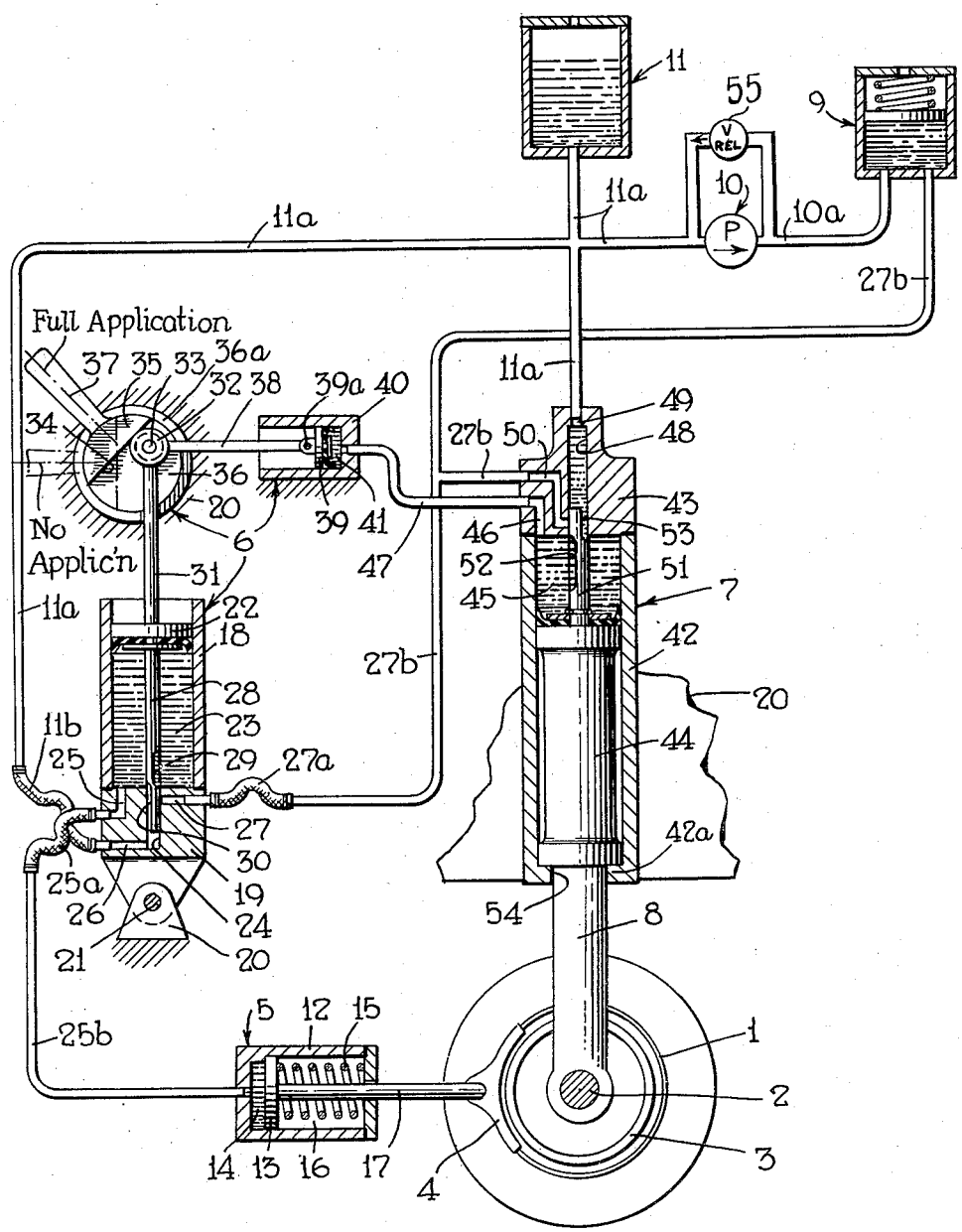
INVENTOR.
Cecil S. Kelley
BY
Adelbert A. Steinmiller
ATTORNEY United States Patent Office 2,824,713
Patented Feb. 25, 1958

2,824,713

AIRPLANE WEIGHT RESPONSIVE WHEEL BRAKE APPARATUS

Cecil S. Kelley, Pittsburgh, Pa., assignor to Westinghouse Air Brake Company, Wilmerding, Pa., a corporation of Pennsylvania Application March 27, 1953, Serial No. 344,971

3 Claims. (Cl. 244—111)

This invention relates to brakes, and more particularly to brakes in which the braking force applied to a wheel of a vehicle, such as an airplane, is controllable according to the weight supported by such wheel.

The principal object of this invention is to provide an improved brake of the above type in which the braking force applied to said wheel may be adjusted to any desired ratio of the weight carried by said wheel.

Another object of this invention is to provide an improved airplane brake of the above type in which the frame of the airplane and the wheel will be maintained in substantially a fixed position relative to each other when the plane is on the ground, despite variation in the weight carried by said wheel or in the degree of brake application.

Another object of this invention is to provide an improved brake for an airplane wheel in which the brake, if applied, will automatically release when the wheel leaves the ground.

Other objects and advantages will become apparent from the following more detailed description of the invention.

In the accompanying drawing, the single figure is a side elevational view, partly in section and partly in outline, of an airplane brake apparatus embodying my invention, shown in association with an airplane wheel and frame.

Description

As shown in the drawing, the reference numeral 1 designates an airplane wheel mounted, in the well-known manner, on a horizontal axle 2 extending transversely of the plane, and adapted to turn in a clockwise direction, as viewed in the drawing, upon landing of the plane. Annular means to be braked, such as a drum 3, is secured for rotation with the wheel 1, and a braking element, such as a brake shoe 4, is adapted to be moved into frictional engagement with the outer periphery of the drum 3 for braking said wheel. A brake cylinder device 5 actuable by fluid under pressure, preferably hydraulic, is provided for effecting engagement of the shoe 4 with the drum 3.

According to the invention, and as will be described subsequently in greater detail, the improved brake apparatus comprises a manually adjustable control valve device 6 for controlling supply of hydraulic fluid under pressure to the brake cylinder device 5 to some proportionate value of a weight-controlled pressure; a valve device 7 for creating such weight controlled pressure; a wheel-supporting rod 8 for actuating the valve device 7; an accumulator 9 of any well-known type for storing hydraulic fluid under pressure for supply to the devices 6 and 7; a pump 10, which may be of any suitable type, such as a gear pump, of adequate capacity for pressurizing hydraulic fluid required for operation of the apparatus and discharging such fluid into the accumulator 9 by way of a pipe 10a, and a sump 11 containing sufficient hydraulic fluid to supply the requirements of the pump 10 by way of a pipe 11a connected to the inlet side of said pump. The pump 10 may, for the purpose of illustration only, be continuously operated, and in order to limit to a chosen degree the maximum pressure and quantity of hydraulic fluid which may be stored in the accumulator, a pressure relief valve 55 of any suitable type, may be connected to the pipe 10a for operation upon attainment of said chosen pressure to open said pipe to the pump inlet pipe 11a.

It will be understood that an apparatus of the type disclosed herein may be associated with each wheel to be braked, except for certain components such as the accumulator 9, pump 10 and sump 11, which preferably are of such capacity that one of each of such components may service all the brake apparatus for the entire airplane.

The brake cylinder device 5 may be of any well-known construction and may, for sake of illustration, comprise a hollow cylindrical casing 12 within which is slidably mounted a piston 13 subject opposingly to hydraulic fluid in a pressure chamber 14 and to action of a spring 15 suitably arranged in a non-pressure chamber 16 which is open to atmosphere; said chambers 14 and 16 being on opposite sides of said piston and defined by said piston and by the respective end walls of said casing. A piston rod 17 is operably attached at its one end to the side of piston 13 within chamber 16 and extends coaxially through and exteriorly of said chamber, while its opposite end is operatively connected to the brake shoe 4, either directly as shown in the drawing or by way of suitable kinematic linkage which will enable actuation of additional brake shoes (not shown), if so desired.

The adjustable control valve device 6 comprises a casing 18, preferably tubular as shown in the drawing. A base 19 is suitably attached to one end of the casing 18 for sealing off said end and for other reasons to be brought out in subsequent description. The base 19 is pivotally connected to a fixed member, such as the frame 20 of the airplane, through the medium of a pin 21, for reasons which will become apparent from subsequent description of operation.

A piston 22 is slidably mounted within the casing 18, thereby defining a pressure chamber 23 between said piston and the base 19, which chamber is completely filled with hydraulic fluid. A bore 24 coaxially aligned with and of substantially smaller diameter than the inside diameter of the casing 18 is formed within the base 19 and is open at one end to the chamber 23. The chamber 23 is in constant fluid communication with the chamber 14 of brake cylinder device 5 by way of an internal passage 25 in the base 19, a flexible conduit 25a, and a pipe 25b; the bore 24 at its opposite or interior end is in constant fluid communication with the sump 11 by way of an internal passage 26 in said base, a flexible conduit 11b and a branch of the pipe 11a; and the bore 24 in the side wall thereof near the chamber 23 is in fluid communication with the accumulator 9 by way of an internal passage 27 in said base, a flexible conduit 27a and a pipe 27b (said flexible conduits being necessary to permit the aforementioned pivotal movement of the base 19 relative to the airplane frame 20).

A cylindrical valve 28, centrally disposed in the chamber 23 and attached at its one end to the piston 22, is slidably accommodated at its opposite end within the bore 24 for controlling, according to its position within said bore, communication of hydraulic fluid between said chamber and the passages 26 and 27.

The valve 28 has two oppositely arranged, axially extending grooves 29 and 30 which are formed in the outer periphery of said valve. The groove 30 extends from the end of valve 28 in bore 24 a certain distance toward the piston 22. The groove 29 is constantly open, at its end nearest piston 22, to chamber 23, while its opposite end terminates slightly past the adjacent end of groove 30. The grooves 29 and 30 are so disposed and of such length that when valve 28 is in a "release" position, in which it is shown in the drawing, the groove 29 is exposed exclusively to chamber 23 and the valve 28 seals off communication between the passage 27 and bore 24, and the groove 30 is exposed at its one end to chamber 23 and at its opposite end to the bore 24 for establishing communication between said chamber and passage 26; when the valve 28 is in a "lap" position, which will be assumed upon movement thereof from its aforesaid "release" position toward the bottom of bore 24, the groove 30 is exposed solely to said bore and the groove 29 is partly exposed to chamber 23 but is not in registry with the passage 27, and hence communication is prevented between said chamber and the passages 26 and 27; when the valve 28 is in a "supply" position, which will be assumed upon slight further movement thereof into the bore 24, the groove 30 still remains exposed solely to the bore 24, but the groove 29 is in registry with both chamber 23 and the passage 27 for establishing communication therebetween, and the unattached transverse end of valve 28 will abut the bottom of said bore, for reasons to be brought out in subsequent description of operation. It is to be noted that the valve 28 will assume its "lap" position only when it is in one specific location relative to the bore 24, and that said valve will assume its "supply" or "release" position upon slight movement in opposite directions, respectively, out of its said "lap" position.

A rod 31 coaxially aligned with the piston 22 is rigidly connected at its one end to said piston at the side thereof opposite the valve 28 to serve as a medium for actuating said piston. The rod 31 at its opposite end is operably connected to a roller follower 32 through the medium of a transverse pin 33. The follower 32 is adapted for rolling engagement with a cam surface 34 of a cam 35 formed integrally with the near transverse end, as viewed in the drawing, of a cylinder 36, which is suitably supported for rotation within a cylindrical sleeve member 36a attached to the frame 20 of the airplane. The cam 35 is in the form of a segment of a cylinder, and the cam surface 34 is formed by the segment chord. The cam 35 is adjustable rotarily within the sleeve 36a by any suitable means, such as, for sake of illustration, a manually operable handle 37 rigidly connected to the circumferential portion of said cam. The handle 37 has a "full application" limit position, in which it is shown in the drawing and in which the cam surface 34 is disposed at substantially a 45° angle relative to the axis of rod 31, and has a "no application" limit position, as indicated by a suitable legend in the drawing, in which said cam surface will be in substantially parallel relationship to the axis of said rod 31. The handle 37 is adjustable to any desired position between the limit positions, just described, for correspondingly positioning the cam 35 for reasons which will be later brought out.

A rod 38 is disposed at substantially right angles to the axes of both the rod 31 and transverse pin 33. The rod 38 is pivotally connected at its one end to the follower 32 through the medium of the pin 33, and is pivotally connected at its opposite end to one side of a piston 39 at the center thereof through the medium of a transverse pin 39a. The piston 39 is slidably mounted within the cylindrical bore of a casing 40 rigidly associated with a fixed member, such as the airplane frame 20. The aforementioned pivotal connection between the rod 38 and pin 39a permits movement of said rod into various angular positions without causing cocking of piston 39 within the bore of casing 40. The casing 40 is completely open at its rod 38 end and closed at its opposite end, thereby defining a pressure chamber 41 between the piston 39 and said opposite end, which chamber 41 is filled with hydraulic fluid.

The valve device 7 comprises a casing 42 disposed in rigid association with the airplane frame 20 and having a vertically arranged piston bore, the upper end of which is closed by a removable head 43 and the lower end of which is partly closed by an annular inwardly directed flange 42a. An elongated piston 44 is slidably mounted in the vertical piston bore in the casing 42 and cooperates with head 43 to define a pressure chamber 45 between said head and the upper face of said piston. The chamber 45 is completely filled with hydraulic fluid and is in constant fluid communication with the chamber 41 of the valve device 6 by way of an internal passage 46 in the head 43 and a pipe 47. A bore 48 of substantially smaller diameter than the inside diameter of the casing 42 is formed in the head 43 and extends vertically upward from the chamber 45 in coaxial alignment with said piston 44. The bore 48 at its upper end is in constant fluid communication with the sump 11 by way of an internal passage 49 in the head 43 and a branch of the pipe 11a; and an internal passage 50 in the head 43 opens at its one end into said bore at a point just above the chamber 45 while at its opposite end said passage 50 is in constant communication with the accumulator 9 by way of a branch of the pipe 27b.

A cylindrical valve 51, similar in configuration to the valve 28, is centrally disposed in the chamber 45, said valve being rigidly attached at its lower end to the upper end of piston 44 and slidably accommodated at its upper end within the bore 48 for controlling, according to its position, communication of hydraulic fluid between said chamber and the passages 49 and 50.

The valve 51 has two oppositely arranged, axially extending grooves 52 and 53 which are formed in the outer periphery of said valve. The groove 53 extends from the upper transverse end of valve 51 toward the piston 44, while the groove 52 commences a slight distance above the lower end of groove 53 and extends downward toward said piston. The grooves 52 and 53 are so disposed and of such length that when the valve 51 is in a "release" position, in which it is shown in the drawing, the groove 52 is exposed exclusively to the chamber 45, the valve 51 seals off communication between passage 50 and bore 48, and the groove 53 is exposed at its one end to chamber 45 and at its opposite end to the bore 48 for establishing communication between said chamber and passage 49; when the valve 51 is in a "lap" position, which occurs upon a certain downward movement of the head 43 relative thereto, the groove 53 is exposed solely to the bore 48, and the groove 52 is exposed at its lowermost end to chamber 45 while its uppermost end is disposed within bore 48 but out of registry with the passage 50 so that communication is prevented between said chamber and the passages 49 and 50; and when the valve 51 is in a "supply" position, which occurs upon further downward movement of the head 43 relative thereto, the groove 53 remains exposed solely to the bore 48 and the lowermost end of the groove 52 remains open to chamber 45 while its uppermost end is in registry with the passage 50 for establishing communication between said chamber 45 and passage 50; the groove 52 extending for sufficient axial length, as shown in the drawing, to assure that such groove will never be sealed off by downward movement of said head relative to said valve. It is to be noted that the "lap" position of valve 51 is in only one specific location of said valve relative to the head 43 and that once in its "lap" position said valve will assume its "supply" position or "release" position upon slight movement of said head in the respective directions relative to said valve.

The support rod 8 is secured at its upper end to the lower end of the piston 44, being coaxially aligned with said piston and extending downwardly therefrom with clearance through a suitable opening 54 encircled by flange 42a at the lower end wall of casing 42. At its lower end the rod 8 is mounted on the axle 2 for supporting said axle and the wheel 1 connected thereto when said wheel is off the ground; this support being effected through abutting engagement of the lower face of piston 44 with the annular flange 42a. When the wheel 1 is on the ground, the rod 8 is adapted to support the airplane frame 20 from axle 2 through the piston 44, which piston is elongated to prevent cocking within the vertical bore of casing 42 and thereby enable said piston and said rod to drive the wheel 1 in a clockwise direction upon touchdown and during forward movement of the airplane while taxiing.

Operation

In operation, assume initially that the sump 11 and the accumulator 9 contain sufficient hydraulic fluid for proper operation of the brake apparatus and that all hydraulic fluid chambers, pipes, conduits, internal passages and bores have been bled of air and are completely filled with hydraulic fluid.

Assume now that the airplane is parked on the field and that the handle 37 of valve device 6 is in its previously defined "full application" position. Under these conditions, the valve 51 of valve device 7 is in its previously defined "lap" position, in which the grooves 52 and 53 are so disposed that the chamber 45 is out of communication with the passages 50 and 49, respectively, and the hydraulic fluid in chamber 45, passage 46, pipe 47 and the chamber 41 of valve device 6 is consequently at a constant pressure which equalizes the effect of and is directly proportional to the weight of the frame 20 exerted by the head 43 on fluid in the chamber 45, as will become apparent from subsequent description. The piston 39, subjected to this weight-controlled pressure in chamber 41, exerts thrust on the cam 35 through the medium of the rod 38, which thrust is transmitted by said cam to the piston 22 through the medium of the rod 31. The piston 22 is in such position that the valve 28 is in its previously defined "lap" position, in which the grooves 29 and 30 are so disposed that the chamber 23 is out of communication with the passages 27 and 26, respectively, and the hydraulic fluid in chamber 23, and hence in passage 25, conduit 25a, pipe 25b and the chamber 14 of brake cylinder device 5 is consequently at a constant pressure, which, as will become apparent from subsequent description, equalizes the effect of and is directly proportional to the weight-controlled thrust exerted on the piston 22 by way of the piston 39 and cam 35. The piston 13, by virtue of the pressure of hydraulic fluid in chamber 14 is holding the brake shoe 4 through the medium of rod 17 in binding engagement with the stationary drum 3 with a force directly proportional to the weight-controlled pressure in chambers 41 and 45, as will become more apparent from subsequent description.

Assuming now that the pilot desires to effect a complete release of the brakes preparatory to take-off, he will move the handle 37 of valve device 6 into its "no application" position, as a result of which all of the weight-controlled force exerted on piston 39 by pressure of fluid in chamber 41 will be absorbed by the airplane frame 20 and hence be removed from the rod 31, by virtue of the cam surface 34 being disposed in substantially parallel relationship with the axis of the rod 31. With thrust thus removed from the piston 22, hydraulic fluid will, by action of the spring 15 on the piston 13, be displaced from chamber 14 into chamber 23 by way of the previously described communication and thereby cause the piston 22 to move, without substantial opposition toward the cam 35 and carry the valve 28 into its previously defined "release" position, in which hydraulic fluid under pressure from the brake cylinder device 5 will flow toward the sump 11, by way of chamber 23, groove 30, passage 26, conduit 11b and pipe 11a, and the brake shoe 4 will consequently be withdrawn from engagement with the drum 3 by the aforementioned action of spring 15 on piston 13, as will be understood from preceding description.

Assuming now that the plane is airborne, the weight of the wheel 1 and axle 2, acting through the medium of the rod 8, holds the lower face of the piston 44 of valve device 7 in abutting engagement with the annular flange 42a at the lower end of casing 42, and consequently maintains the valve 51 in its previously defined "release" position, in which the chamber 45, and hence chamber 41 of valve device 6, are in communication with the sump 11 by way of the groove 53, passage 49 and pipe 11a, and hydraulic fluid in said chambers, in the pipe 47 and passage 46 is substantially at atmospheric pressure. As a consequence of the substantially atmospheric pressure in chamber 41, no thrust is exerted by the piston 39 on the cam 35, and therefore, irrespective of the position of the handle 37, no thrust is exerted on the piston 22; and said piston 22, under action of the spring 15 on the brake cylinder piston 13, will have been moved toward cam 35 by displacement of hydraulic fluid to chamber 23 and thus carried the valve 28 into its "release" position, and by virtue of this action of spring 15 on piston 13 the brake shoe 4 will be held disengaged from the drum 3, as will be apparent from preceding description in connection with release of the brakes. Thus, when the plane is airborne, the hydraulic fluid in the valve device 7, and consequently in the device 6 and brake cylinder device 5, will be at substantially atmospheric pressure and the brakes will always be automatically released, irrespective of any variation in the position of the handle 37 after take-off.

Assuming now that the airplane is about to land with the handle 37 in its "no application" position, in accordance with the usual landing procedure. Upon touchdown, the wheel 1 starts to rotate in a clockwise direction, as viewed in the drawing. Then, as the airplane frame 20 gradually settles, upon decrease in wing lift, it causes the casing 42 and head 43 rigidly associated therewith to move downwardly relative to the support rod 8, while said support rod holds the piston 44, and hence the valve 51, stationary. Since at touchdown the valve 51 was in its "release" position by virtue of the previously described effect of the weight of the wheel 1, the head 43, as it moves downward relative to the valve 51, will displace hydraulic fluid from the chamber 45 to the sump 11, by way of the previously described communication, until the groove 53 is no longer in registry with chamber 45 and the valve 51 assumes its "lap" position; said head and said valve will thereupon remain stationary since hydraulic fluid cannot flow from chamber 45 to chamber 41 because the piston 39 is held stationary through the medium of the rod 38 and follower 32 by virtue of the axis of said rod 38 being substantially perpendicular to the cam surface 34, and fluid in said chambers is consequently at a pressure directly proportional to the weight of the frame 20 carried on the wheel 1.

After waiting until the wheel 1 has accelerated substantially to the ground speed of the plane, in accordance with usual landing procedure, the pilot will move the handle 37 into a position toward its "full application" position corresponding to the degree of braking desired. As the handle 37 is thus moved and the angular disposition of cam surface 34 is correspondingly changed, the pressure of hydraulic fluid in chamber 41 will move the piston 39, and hence rod 38, toward cam 35, thereby causing the follower 32 to move angularly downward along the cam surface 34 and advance the rod 31, and hence the piston 22, toward the base 19.

This movement of piston 39 toward the cam 35, causes a reduction in the pressure of hydraulic fluid in chambers 41 and 45 and consequently permits the head 43 to move downward relative to valve 51, thereby causing said valve to assume its "supply" position. With valve 51 in this position, highly pressurized hydraulic fluid flows from the accumulator 9 to the chamber 45 by way of pipe 27b, passage 50 and groove 52, thereby increasing the pressure of fluid in chambers 45 and 41.

During the aforementioned movement of piston 22 toward the base 19, said base pivots about pin 21 to conform to the changing angular disposition of the rod 31 and thus preserve coaxial alignment of said rod with said piston 22 and the casing 18; at the same time hydraulic fluid is displaced by piston 22 from chamber 23 to the sump 11 by way of groove 30 and the previously described communication until said groove 30 is no longer in registry with said chamber, whereupon further movement of said piston 22 toward the base 19 will displace such fluid from chamber 23 to chamber 14 of brake cylinder device 5 by way of the previously described communication, thereby moving the piston 13 against action of the spring 15 and consequently enabling said piston 22 to carry the valve 28 into its "supply" position in which the end of said valve abuts the bottom of bore 24.

When the valve 28 attains its "supply" position, the piston 22, rod 31, follower 32, rod 38 and hence piston 39 will be temporarily stationary. Cessation of movement of piston 39 permits the hydraulic fluid under pressure being admitted from the accumulator 9 to chambers 45 and 41, in the manner just described, to boost the pressure of fluid in chamber 45 acting on the head 43 sufficiently to cause elevation of said head in opposition to the weight of the frame 20 therein and thereby cause valve 51 to again assume its "lap" position, in which further pressurization of chambers 45 and 41 will be prevented and the pressure of fluid in said chamber will again be directly proportional to the weight of said frame.

While the valve 51 is assuming its "lap" position, in the manner just described, the valve 28 will remain in its "supply" position, permitting highly pressurized hydraulic fluid to flow from the accumulator 9 to the chamber 23 by way of the pipe 27b, conduit 27a, passage 27 and groove 29, and from said chamber to chamber 14 in the brake cylinder device 5 by way of the previously described communication, causing the piston 13 to move further against resistance of spring 15 and carry the brake shoe 4, through the medium of rod 17, into frictional braking engagement with the drum 3. After such engagement, the piston 13 will remain substantially stationary, but the valve 28 will remain in its "supply" position and cause an increasing braking force to be exerted on said drum by virtue of increasing pressurization of fluid in chambers 23 and 14, until the substantially constant force (because valve 51 is in its "lap" position) operatively exerted by piston 39 on the piston 22 through the medium of rod 38, follower 32, cam 35 and rod 31 is overcome by the pressure of hydraulic fluid acting on the chamber 23 side of piston 22, whereupon piston 22 will be moved by pressure of such fluid toward the cam 35 and will carry valve 28 into its "lap" position, in which further pressurization of the chambers 23 and 14 will be prevented. The piston 22, as it moves toward the cam 35, advances the follower 32 upwardly along the cam surface 34, causing a force to be transmitted to the piston 39 by way of rod 31, cam 35, and rod 38, which causes piston 39 to move away from said cam and displace some hydraulic fluid from chamber 41 into chamber 45. Fluid thus displaced to chamber 45 will effect elevation of the head 43 and thereby cause valve 51 to assume its "release" position momentarily until an equivalent volume of such fluid is bled off to the sump 11 by way of groove 53 and the previously described communication, whereupon said head will move downward and the valve 51 will reassume its "lap" position, as will be apparent from preceding description.

It will thus be seen that when the valve 51 is in its "lap" position, the pressure of fluid in chamber 45 and hence in chamber 41 is directly proportional to the weight of the frame 20; that pressure of fluid in chamber 41 is converted to a corresponding control force which is transmitted to the piston 22 by way of piston 39, rod 38, follower 32, cam 35 and rod 31; and that the valve 28 will not assume its "lap" position until the pressure in chamber 23, which is equal to the brake cylinder pressure, balances the opposing effect of the control force acting on piston 22. The brake cylinder pressure thus provided during a brake application will be proportional to the weight-controlled pressure in chamber 45 and hence to the weight supported by the wheel 1.

It will also be seen that variation in the angular disposition of the cam surface 34 by actuation of the handle 37 will effect a corresponding proportionate change in the degree of the aforementioned control force transmitted through the medium of the cam 35 from piston 39 to piston 22 to regulate the degree of brake cylinder pressure as reflected in chamber 23, and hence the braking force on the wheel 1, for a given weight-controlled pressure in chamber 41.

Assume now that after touchdown and after an initial brake application has been effected in the above manner, the pilot desires to change the degree of braking, but not completely release the brakes. To accomplish this he will actuate the handle 37 and thereby cam 35 to a position, except its "no application" position, which will provide the desired change in force exerted by piston 22 on the fluid in chamber 23, and transmitted to the brake shoe 4 through the medium of the solid column of hydraulic fluid in chambers 23 and 14 acting on the rod 17. Hence, under the assumed condition, the braking force will immediately change in response to change in position of handle 37.

Assume now that, after landing and while the brakes are applied, the weight or force supported or exerted on the wheel 1 changes for any reason, but said wheel does not leave the ground. Under these conditions, the head 43 will remain substantially stationary since it is supported by incompressible hydraulic fluid; but such variation in the force acting downwardly on the wheel 1 will effect a corresponding change in the force exerted by said head on such fluid and hence change the magnitude of the weight-controlled force acting in chamber 41 on piston 39. The braking force will immediately vary according to such change in control force without displacement of hydraulic fluid because chambers 45, 41, 23 and 14 were completely filled with such fluid during the earlier brake application and consequently the pistons 39, 22 and 13 and the valves 51 and 28 will remain substantially stationary.

Assume now that the wheel 1 bounces off the ground during landing or when running along an uneven runway, and consequently bounces the frame 20 upward relative to the ground. The piston 44 will drop downward into abutment with the annular flange 42a at the lower end of casing 42, as shown in the drawing, consequently carrying valve 51 into its "release" position for releasing the brakes on wheel 1 and maintaining said brakes released until said wheel again touches down, at which time the brakes will be automatically reapplied to said wheel, as will be apparent from preceding description. It will therefore be seen that under the condition in question the wheel may continue to spin as it leaves the ground and upon subsequent contact with the ground may return substantially to ground speed before the brakes become reapplied. By thus preventing the wheel contacting the ground in a locked condition undesirable wear on the wheel tire is avoided as well as possibility of difficulty in handling of the plane or damage otherwise to the plane.

*Summary*

It will now be seen that an improved brake apparatus has been provided in which, when the brakes are applied, the brake cylinder pressure will always be directly proportional to a controlled pressure, which varies according to the weight of the vehicle frame carried on a wheel; and that the brake cylinder pressure may, by suitable adjustment of the position of cam 35, be regulated to any desired ratio of such weight-controlled pressure to control the degree of brake application.

The improved brake apparatus also provides for positive automatic brake release in the event a wheel for any reason leaves the ground.

Having now described my invention, which I claim as new and desire to secure by Letters Patent, is:

1. An apparatus for braking a wheel of a vehicle having a frame movable vertically relative to said wheel, fluid pressure operated braking means for applying a braking force to said wheel, first valve means for controlling pressure of fluid in said braking means, a movable abutment operably connected to said first valve means and subject at one side to pressure of fluid in said braking means and at the opposite side to an operator-controlled thrust force, wheel-supporting means one portion of which has sealing, slidable engagement with the wall of a generally vertical bore in said frame, said bore being closed adjacent its upper end for cooperation with said one portion to define a pressure chamber, second valve means controlled by position of said wheel-supporting means relative to said frame and operative to so control supply of fluid under pressure to and release of fluid under pressure from said chamber as to normally maintain in said chamber a fluid pressure which is proportional to the weight carried by said wheel, means controlled by pressure of fluid in said chamber for converting such pressure into a corresponding weight-controlled thrust force, follower means connecting said last mentioned means to said movable abutment, and operator controlled cam means carried by said frame and having a cam surface substantially in the form of a segment chord and engaged by said follower means and also having a handle or the like for adjustment of the angular disposition of the cam surface relative to said follower means such that said operator-controlled force is regulatable to any desired ratio of said weight-controlled force.

2. An apparatus for braking a wheel of a vehicle having a frame vertically movable relative to said wheel, said apparatus comprising, in combination, means operable by fluid under pressure for applying a braking force to the wheel, first means subject opposingly to pressure of fluid in said fluid pressure operable means and to an operator-controlled thrust force and operative to so control pressurization and depressurization of fluid in said fluid pressure operable means as to provide therein fluid at a pressure proportionate to said thrust force, wheel-supporting means subject opposingly to pressure of fluid in a chamber and to an upwardly directed weight-induced force reactive to the weight carried by the wheel, valve means positively connected to the upper end of said wheel-supporting means and controlled according to positioning of said wheel-supporting means relative to said frame and operative to so control pressure of fluid in said chamber as to provide in said chamber fluid at a pressure proportionate to said reactive force, means for converting pressure of fluid in said chamber into a corresponding weight-controlled thrust force, follower means providing a cooperative connection between said converting means and said first means, and operator-controlled cam means for so controlling operation of said follower means as to regulate said operator-controlled thrust force at any desired ratio of said weight-controlled thrust force.

3. An apparatus for braking a wheel of a vehicle having a frame vertically movable relative to said wheel, said apparatus comprising, in combination, means operable by fluid under pressure for applying a braking force to the wheel, first means subject opposingly to pressure of fluid in the last named means and to an operator-controlled thrust force and operative to so control pressurization and depressurization of fluid in said last named means as to provide therein fluid at a pressure proportionate to said thrust force, wheel-supporting means comprising a wheel-supporting axle, a movable abutment arranged above said axle and slidably mounted in a bore which is formed in the frame and is enclosed at its upper end to define a chamber between said upper end of said bore and said movable abutment, and a generally vertically disposed rod connected at its respective ends to said movable abutment and to said axle, said movable abutment being subject opposingly to pressure of fluid in said chamber and to a weight-induced force reactive to the weight imposed by the frame on the wheel, valve means operably controlled according to the positioning of said movable abutment means relative to the frame and operative to provide in said chamber fluid at a pressure proportionate to said reactive force, means for converting pressure of fluid in said chamber into a corresponding weight-controlled thrust force, follower means providing a cooperative connection between said converting means and said first means, and an operator-controlled cam means for so controlling operation of said follower means as to regulate said operator-controlled thrust force at any desired ratio of said weight-controlled thrust force.

References Cited in the file of this patent

UNITED STATES PATENTS

| | | |
|---|---|---|
| 1,457,157 | Galbraith | May 29, 1923 |
| 1,630,810 | Simpson | May 31, 1927 |
| 1,664,510 | Hughes, Jr. | Apr. 3, 1928 |
| 1,763,405 | Messier | June 10, 1930 |
| 1,887,583 | Down | Nov. 15, 1932 |
| 2,490,641 | Du Rostu (2) | Dec. 6, 1949 |
| 2,491,551 | Cross | Dec. 20, 1949 |
| 2,498,438 | Du Rostu (1) | Feb. 21, 1950 |
| 2,574,426 | Trevaskis | Nov. 6, 1951 |